United States Patent
Smith

(10) Patent No.: US 11,532,405 B2
(45) Date of Patent: Dec. 20, 2022

(54) PASSIVELY COOLED ION EXCHANGE COLUMN

(71) Applicant: P&T Global Solutions, LLC, Salt Lake City, UT (US)

(72) Inventor: Eric Smith, Columbia, MD (US)

(73) Assignee: P&T GLOBAL SOLUTIONS, LLC, Salt Lake City, UT (US)

(*) Notice: Subject to any disclaimer, the term of this patent is extended or adjusted under 35 U.S.C. 154(b) by 0 days.

(21) Appl. No.: 14/875,485

(22) Filed: Oct. 5, 2015

(65) Prior Publication Data

US 2017/0047135 A1 Feb. 16, 2017

Related U.S. Application Data

(60) Provisional application No. 62/204,793, filed on Aug. 13, 2015.

(51) Int. Cl.
*G21F 9/12* (2006.01)
*C02F 1/42* (2006.01)
*C02F 101/00* (2006.01)

(52) U.S. Cl.
CPC .............. *G21F 9/12* (2013.01); *C02F 1/42* (2013.01); *C02F 2101/006* (2013.01); *C02F 2303/10* (2013.01); *Y02W 10/30* (2015.05)

(58) Field of Classification Search
CPC ........ C02F 1/42; C02F 2101/006; G21F 5/10; G21F 9/12; B01D 35/18
USPC .................................................. 210/185, 186
See application file for complete search history.

(56) References Cited

U.S. PATENT DOCUMENTS

| | | | |
|---|---|---|---|
| 3,046,278 A | 7/1962 | Feely | |
| 3,229,759 A | 1/1966 | Grover | |
| 3,532,159 A * | 10/1970 | Broadwell | F28D 15/0233 165/104.22 |
| 4,040,480 A * | 8/1977 | Richards | G21F 5/10 165/104.26 |
| 6,802,671 B1 * | 10/2004 | Badie | G21F 5/10 376/272 |

(Continued)

FOREIGN PATENT DOCUMENTS

| | | |
|---|---|---|
| CN | 1345452 | 4/2002 |
| CN | 101412519 A | 4/2009 |
| CN | 103377732 | 10/2013 |

(Continued)

OTHER PUBLICATIONS

PCT International Search Report and Written Opinion for International Application No. PCT/US2016/037232, dated Sep. 12, 2016 (11 pp.).

(Continued)

*Primary Examiner* — Akash K Varma
(74) *Attorney, Agent, or Firm* — Norton Rose Fulbright US LLP

(57) ABSTRACT

An ion exchange system includes an ion exchange column filled with ion exchange media and a passive cooling system. The passive cooling system includes a working fluid that transfers heat away from the ion exchange column. In one embodiment, the working fluid is in a closed system. In another embodiment, the passive cooling system includes a heat pipe. In yet another embodiment, the ion exchange system is used to separate radionuclides, such as Cs-137 from a liquid waste stream.

21 Claims, 1 Drawing Sheet

(56) References Cited

U.S. PATENT DOCUMENTS

2014/0263008 A1    9/2014   Barker et al.

FOREIGN PATENT DOCUMENTS

| CN | 103761994 | 4/2014 | | |
|---|---|---|---|---|
| CN | 203966576 | 11/2014 | | |
| JP | S 57128325 | 8/1982 | | |
| JP | 2013/057578 | 3/2013 | | |
| JP | 2015/508486 | 3/2015 | | |
| WO | WO 2013085644 A1 | * | 6/2013 | ............... G21F 9/06 |

OTHER PUBLICATIONS

Spires, R.H., et al., "Salt Processing through Ion Exchange at the Savannah River Site Selection of Exchange Media and Column Configuraton," Waste Management Symposium 2009 Conference, Mar. 1-5, 2009, Phoenix, AZ.

Lee, S.Y., "Heat Transfer Analysis for Fixed GST and RF Columns," WSRC-STI-2007-00345, Washington Savannah River Company, Savannah River National Laboratory, Aiken, SC, Oct. 2007.

LEE, S.Y, "Thermal Modeling Analysis of CST Media in the Small Column Ion Exchange Project," SRNL-STI-2010-00570, Savannah River National Laboratory, Savannah River Nuclear Solutions, Aiken, SC, Oct. 2010.

Office Action Issued in Chinese Patent Application No. 201680048258. 6, dated Dec. 25, 2020.

Office Action Issued in Corresponding Australian Patent Application No. 2016306111, dated Oct. 28, 2020.

Office Action Issued in Corresponding Japanese Patent Application No. 2018-506860, dated Jan. 7, 2021.

Office Communication issued in Canadian Patent Application No. 2,994,937, dated Aug. 9, 2022.

* cited by examiner

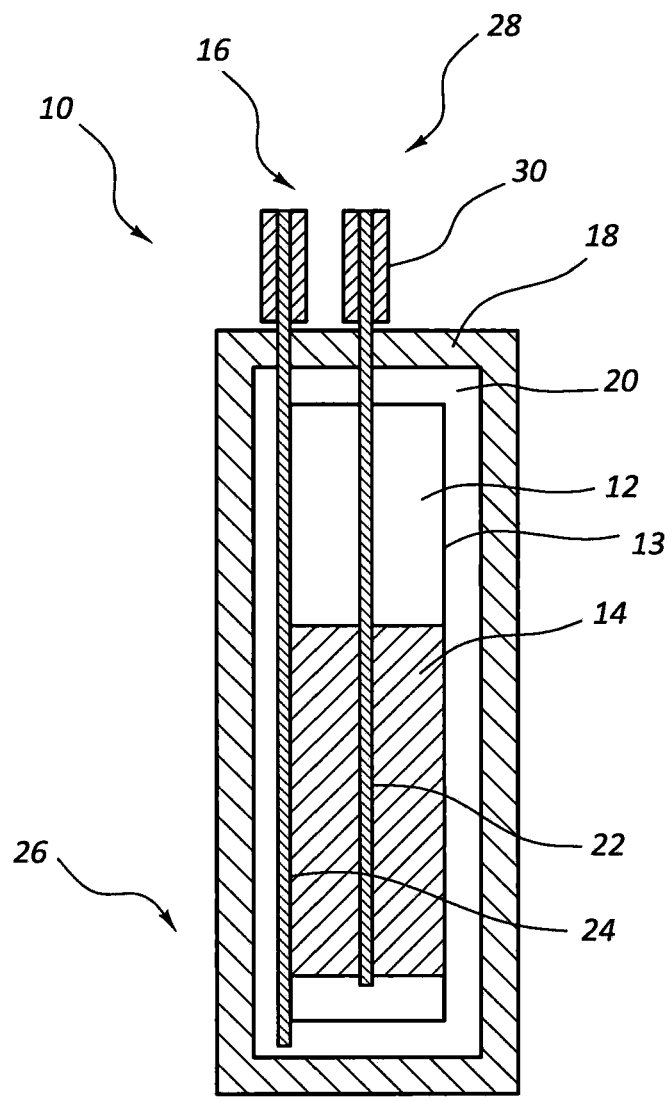

PASSIVELY COOLED ION EXCHANGE COLUMN

CROSS-REFERENCE TO RELATED PATENT APPLICATIONS

This claims the benefit of U.S. Provisional Pat. App. No. 62/204,793, titled "System and Method for Passively Removing Heat from Ion Exchange Columns Used to Remove Radionuclides from Liquids," filed on 13 Aug. 2015, the entire contents of which are incorporated by reference into this document. In the event of a conflict, the subject matter explicitly recited or shown in this document controls over any subject matter incorporated by reference. The incorporated subject matter should not be used to limit or narrow the scope of the explicitly recited or depicted subject matter.

BACKGROUND

Radioactive waste is generated by the operation of nuclear reactors, processing used nuclear fuel, the operation of particle accelerators, and other sources. A portion of this waste is in the form of a liquid stream that contains radioactive contaminants. The liquid waste must be processed to render it safe for disposal through solidification, radionuclide removal, and/or other methods.

Ion exchange is a common method used to treat liquid radioactive waste containing significant amounts of radionuclides. The ion exchange process involves moving the liquid waste stream through an ion exchange column filled with ion exchange media. The radionuclides in the liquid are absorbed by the ion exchange media and separated from the remaining liquid.

The amount of radionuclides absorbed by the ion exchange media increases as the process proceeds. The buildup of radiation emitting nuclides in the ion exchange media is significant and can produce dangerous radiation fields around the ion exchange column. In some situations, the ion exchange columns are enclosed in or surrounded by radiation shielding material to lower radiation levels and protect workers.

The high radiation fields emitted by the radionuclides generate heat in the ion exchange media. During operation, the heat is transferred away from the ion exchange column by the liquid waste stream. There are times, however, when flow through the column is stopped. Also, the ion exchange media eventually becomes loaded to near its capacity and the column is removed from service. In both of these situations, the liquid waste stream no longer cools the column.

The heat generated by the radionuclides can increase the temperature to the point that it boils the water in the column, degrades the ion exchange media, and/or causes other adverse effects and safety concerns. Transferring heat away from the ion exchange column through natural convection is ineffective because of the low thermal conductivity of the ion exchange media and/or the presence of the radiation shielding surrounding the column. These concerns have led facilities to not fully load the ion exchange media, limit the size of the column, and/or install expensive safety credited active cooling systems.

The most common ways facilities currently address high temperatures associated with radioactive decay in a loaded ion exchange column are as follows: (1) the column is connected to a safety credited system that actively cools the column; (2) the column is connected to a purge system and allowed to heat until all the liquid is boiled away and purged from the column; (3) the diameter of the column is limited to increase the column surface to volume ratio thus lowering the peak temperature; and/or (4) the amount of radionuclides absorbed in the ion exchange media is limited to control the rate of heat generation in the media.

These methods suffer from a number of drawbacks. Methods 1 and 2 are extremely expensive to install and maintain because they require redundant systems with backup power supplies that can operate continuously. Method 2 can produce peak temperatures in the ion exchange media, column and/or radiation shielding that presents a safety hazard and imposes additional design limitations on the equipment. Method 3 limits the capacity of the ion exchange column because the diameter is proportional to the flowrate through it. Method 4 increases the amount of ion exchange media used and the frequency of its replacement.

SUMMARY

An ion exchange system includes an ion exchange column filled with ion exchange media and a passive cooling system. The ion exchange system can be used to treat or otherwise separate contaminants from a liquid waste stream. It is especially useful for separating one or more radionuclides from a liquid radioactive waste stream.

The passive cooling system passively transfers heat from the ion exchange column to the surrounding environment. It is referred to as being "passive" because it uses natural processes and techniques to dissipate heat without adding energy. The passive cooling system uses the structural design of the system and its components combined with energy available from the natural environment to dissipate heat. It does not use external energy from electricity, combustion, or the like to power mechanical equipment such as pumps and fans to dissipate the heat.

A passively cooled ion exchange column provides a number of advantages. Some of the advantages include: the use larger diameter ion exchange columns, fully loading the ion exchange media with radionuclides, and satisfying safety requirements without installing expensive, safety credited cooling systems. These advantages simplify the system and result in substantial cost savings.

The passive cooling system can have a variety of configurations. In one embodiment, the passive cooling system includes one or more heat pipes that are in thermal communication with the ion exchange column. The heat pipe can be oriented at least substantially vertically with a first end positioned inside or adjacent to the ion exchange column and a second end extending outward above the column. In one embodiment, the heat pipe is a thermosiphon.

The ion exchange system can include radiation shielding surrounding the ion exchange column. The heat pipe extends through the radiation shielding to dissipate heat from the ion exchange column to the ambient environment. In one embodiment, the heat pipe includes a natural convection radiator that enhances heat transfer from the heat pipe to the ambient environment.

In one embodiment, the ion exchange system is used to separate radionuclides such as Cs-137 from a liquid radioactive waste stream. The passive cooling system prevents the ion exchange media and/or the ion exchange column from getting too hot when liquid flow through the column is interrupted or when the column is taken out of service after the ion exchange media is fully loaded with contaminants.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which:

FIG. 1 is a diagram of one embodiment of a system for passively removing heat from an ion exchange column containing radionuclides.

DETAILED DESCRIPTION

Referring to FIG. 1, an ion exchange system 10 includes an ion exchange column 12 and a passive cooling system 16. The ion exchange column 12 includes a housing 13 and ion exchange media 14 positioned inside the housing 13. The ion exchange system 10 can be used to remove or separate contaminants from any liquid waste stream but it is especially useful for removing radionuclides from liquid radioactive waste streams.

Radionuclides captured through ion exchange can continue to be radioactive and undergo decay releasing energetic photons and particles. As these decay products interact with the liquid waste stream, ion exchange media 14, and other structures of ion exchange column 12, the decay products' energy can be absorbed by the surroundings to raise the temperature thereof. Normally this energy is carried away with the liquid waste stream. However, if flow is stopped and/or if liquid in ion exchange column 12 is drained, the temperature of the column can rise until the rate of heat generation within the column reaches equilibrium with the rate of heat removal.

The ion exchange system 10 is configured to limit the temperatures produced by radioactive decay of the radionuclides absorbed by the ion exchange media 14 by passively rejecting the heat to the ambient environment. This makes the ion exchange column 12 intrinsically safe and economical.

In general, the ion exchange system 10 facilitates the exchange of ions between an electrolyte solution (the liquid waste stream) and an ion containing media (the ion exchange media 14). As the liquid waste flows over and through the ion exchange media 14, ions in the liquid are exchanged with ions in the media 14. An example of a common ion exchange system is a water softener where calcium ions in the water are exchanged with sodium ions in the media.

The ion exchange system 10 can remove any of a number of contaminants from the liquid waste stream. In one embodiment, the ion exchange system 10 removes radionuclides such as Cs-137 from the liquid waste stream. It should be appreciated that the ion exchange system 10 can remove other radionuclides as well.

The ion exchange column 12 is a vessel designed to contain the pressure of the flowing liquid waste and the ion exchange media 14. The ion exchange column 12 includes one or more inlets through which the liquid waste flows into the column 12 from corresponding piping and one or more outlets through which the treated liquid waste flows out of the column 12. The ion exchange column 12 can also include one or more internal components that distribute the liquid waste to provide even flow distribution over the ion exchange media 14 and to evenly collect the treated water after it has passed over the media.

The ion exchange column 12 can include screens, filters, and/or other devices at the inlet and outlet to prevent the ion exchange media 14 from becoming entrained in the liquid waste and exiting the column 12. It can also include other connections through which the ion exchange media 14 can be flushed and/or or removed. Numerous other connections can also be provided to monitor and/or control the performance of the ion exchange column 12.

The ion exchange column 12 can be any suitable column having any suitable configuration. In on embodiment, the ion exchange column 12 is configured to remove radionuclides from a liquid radioactive waste stream. The ion exchange column 12 can also be made of any suitable material. In one embodiment, the ion exchange column 12 is made of metal such as carbon steel, stainless steel, and/or various alloys of carbon steel, stainless steel, and the like.

The ion exchange media 14 can be any suitable material. In one embodiment, the ion exchange media 14 includes solid polymeric and/or mineral-based ion exchange material. Examples of suitable ion exchange media 14 include resins (functionalized porous or gel polymer), zeolites, montmorillonite, clay, soil humus, and the like.

In one embodiment, the ion exchange media 14 is a cation exchanger that exchanges positively charged ions (cations). In another embodiment, the ion exchange media 14 is an anion exchanger that exchanges negatively charged ions (anions). In yet another embodiment, the ion exchange media 14 is an amphoteric exchanger that is capable of exchanging both cations and anions simultaneously.

In one embodiment, the ion exchange system 10 includes radiation shielding 18 that surrounds and/or encloses the ion exchange column 12. The radiation shielding 18 is provided to reduce the intensity of the radiation emitted from the ion exchange column 12. The radiation shielding can be any suitable material such as concrete, cement, heavy metals, and the like. It should be appreciated that in other embodiments the ion exchange system 10 can be operated without radiation shielding 18.

Referring to FIG. 1, the ion exchange system 12 and the radiation shielding 18 are sized to create a gap 20 between the two on the sides, bottom, and top. In one embodiment, the gap 20 is filled with a fluid such as a gas like air, nitrogen, or the like.

The passive cooling system 16 prevents the ion exchange column 12 and/or the ion exchange media 14 from exceeding a set temperature. In one embodiment, the passive cooling system 16 prevents the ion exchange column 12 and/or the ion exchange media 14 from exceeding approximately 100° C. In another embodiment, the passive cooling system 16 prevents water from boiling in the ion exchange column 12.

The passive cooling system 16 includes one or more heat pipes 22, 24 that are used to transfer heat from the ion exchange column 12 to the ambient environment. In one embodiment, the heat pipes 22, 24 extend through the radiation shielding 18 to transfer heat through the radiation shielding 18 to the ambient environment.

The heat pipes 22, 24 each include a first or lower end 26 and a second or upper end 28. The heat pipes 22, 24 can be coupled to or interface with the ion exchange column 12 in any of a number of ways.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The heat pipe 22 shows one embodiment where the first end 26 extends through the housing 13 and contacts the ion exchange media 14. The second end 28 of the heat pipe 22 extends upward and outward from the top of the radiation shielding 18. The heat pipe 22 is shown extending through what is roughly the center of the ion exchange column 12 but it should be appreciated that it can be positioned anywhere inside the housing 13.

The heat pipe 24 shows another embodiment where the first end 26 contacts the outside of the housing 13 and the second end 28 extends upward through the radiations shielding 18. In this embodiment, the heat pipe 24 doesn't extend into the interior of the housing 13. This configuration is likely easier and less expensive to manufacture but may not be as efficient at transferring heat as the heat pipe 22.

The heat pipes 22, 24 can include natural convection radiators 30 coupled to the second end 28 of the heat pipes 22, 24. The natural convection radiators 30 enhance or increase the rate of heat transfer from the heat pipes 22, 24 to the ambient environment. The natural convection radiators 30 are passive and do not require any added energy to operate.

It should be appreciated that the passive cooling system 16 can include one or both of the heat pipes 22, 24. Also, the passive cooling system 16 can include other heat pipes that have different configurations and orientations than those shown for heat pipes 22, 24.

The heat pipes 22, 24 can have any suitable configuration. For example, in one embodiment, the heat pipes 22, 24 can have a lengthwise direction that is oriented vertically. In this orientation, the movement of the working fluid through the heat pipes 22, 24 is aided by gravity. The hot working fluid rises from the first end 26, cools at the second end 28, and then drains back downward by gravity. Vertically oriented heat pipes 22, 24 are sometimes referred to as thermosiphons.

In other embodiments, the heat pipes 22, 24 can be oriented horizontally. The working fluid can move horizontally using a wick structure. The working fluid can move through the wick structure by capillary action or other means. It should be appreciated that the heat pipes 22, 24 can also be oriented at an angle from 0° (horizontal) to 90° (vertical).

The heat pipes 22, 24 can be configured to use a single phase working fluid or a dual phase working fluid. A single phase working fluid doesn't change phase as it moves through the heat pipes 22, 24. A dual phase working fluid undergoes a phase change as it moves through the heat pipes 22, 24. In general, the dual phase working fluid evaporates at the hot end of the heat pipes 22, 24 and condenses at the cold end of the heat pipes 22, 24. Heat pipes 22, 24 using dual phase working fluids are preferable because they are capable of transferring more heat than single phase systems.

In one embodiment, the heat pipes 22, 24 each include an elongated sealed chamber into which a wick is installed, a small amount of working fluid or heat transfer fluid is charged, and a vacuum established. The first ends 26 of the heat pipes 22, 24, which are inside the housing 13 or on the outer surface of the housing 13 can be referred to as the evaporator ends 26. The second ends 28 of the heat pipes 22, 24 where heat is rejected can be referred to as the condenser ends 28.

Heat is transferred from the ion exchange media 18 through the wall of the heat pipe 22, 24 to the working fluid at the evaporator ends 26. The working fluid absorbs the heat and changes phase from a liquid to a vapor. Through buoyancy effects and pressure differentials, the vapor rises inside the heat pipes 22, 24 to the condenser end 28. The vapor changes phase from a vapor back to a liquid at the condenser end 28, which releases energy in the form of heat. The heat is conducted through the wall of the heat pipes 22, 24 to the fins that are part of the natural convection radiators 30, and on to the ambient air through natural convection. The condensed working fluid inside the heat pipes 22, 24 is returned to the evaporator end 26 through the force of gravity and/or the capillary action of the wick enclosed in the heat pipe.

Due to the very high heat transfer coefficients for boiling and condensation, the heat pipes 22, 24 are highly effective thermal conductors. The effective thermal conductivity varies with heat pipe length, and can approach 100 kW/(m·K) for long heat pipes, in comparison with approximately 0.4 kW/(m·K) for copper. An example of a heat pipe is shown in U.S. Pat. No. 3,229,759, which is incorporated by reference into this document in its entirety.

The heat pipes 22, 24 are an entire class of heat transfer device that uses evaporation-condensation to transfer energy. Heat pipes can go by the following names: Constant Conductance Heat Pipes (CCHPs), Vapor Chambers (flat heat pipes), Variable Conductance Heat Pipes (VCHPs), Pressure Controlled Heat Pipes (PCHPs), Diode Heat Pipes, Thermosiphons, and rotating heat pipes.

The diameter, length, and physical configuration of the heat pipes 22, 24 can be of any practical dimensions or configuration to allow them to function to remove heat from the ion exchange column 12 and the ion exchange media 14. The heat pipes 22, 24 can be made of stainless steel or any other metal that is compatible with the liquid and ion exchange media 18 contained in the ion exchange column 12. The working fluid within the heat pipes 22, 24 can be water or other liquid that has the desired properties to maintain the column temperature within the desired range. The wick structure, or lack thereof, can be fabricated of sintered cooper or any other combination of materials and structure that produces the desired heat pipe performance.

It should be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All disclosed ranges are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The invention claimed is:

1. An ion exchange system comprising:
   an ion exchange column including a housing and ion exchange media positioned inside the housing, the housing having an inlet for receiving liquid waste comprising one or more radionuclides, and an outlet for discharging treated liquid after the treated liquid has passed over the ion exchange media;
   an elongate heat pipe in thermal communication with the ion exchange column, wherein the elongate heat pipe:
   has first and second closed ends;
   is a closed system defined by the first and the second closed ends; and
   includes a first portion positioned to abut and extend along a surface of the housing of the ion exchange column and a second portion positioned to extend away from the housing, the first portion of the elongate heat pipe extending to the first closed end; and
   radiation shielding surrounding the ion exchange column, the radiation shielding and housing defining a gap filled with gas between the radiation shielding and housing, wherein the gap is a closed volume between the radiation shielding and housing for insulating the ion exchange column;
   wherein the second portion extends through the gap and the radiation shielding for dissipating heat from the ion exchange column to an ambient environment and the first closed end extends into the gap and out of contact with the housing to form a reservoir for working fluid;
   wherein, in a first mode of operation, when the ion exchange column is in-service and at least partially loaded with the one or more radionuclides, liquid waste flows through the ion exchange column transferring heat out of the ion exchange column, and, in a second mode of operation, when flow through the inlet and outlet are stopped and the ion exchange column is out-of-service, drained, and at least partially loaded with the one or more radionuclides, the ion exchange media transfers heat to the second portion of the elongate heat pipe via the first portion of the elongate heat pipe; and
   wherein the elongate heat pipe is configured to indirectly thermally communicate with the ion exchange media.

2. The ion exchange system of claim 1 wherein the second portion of the elongate heat pipe includes a natural convection radiator that enhances heat transfer away from the elongate heat pipe.

3. The ion exchange system of claim 1 wherein the elongate heat pipe is a thermosiphon.

4. The ion exchange system of claim 1 wherein the elongate heat pipe includes a dual phase working fluid.

5. The ion exchange system of claim 1 wherein the elongate heat pipe includes a single phase working fluid.

6. The ion exchange system of claim 1 wherein the elongate heat pipe is oriented at least approximately vertically.

7. The ion exchange system of claim 1 wherein the elongate heat pipe is a first heat pipe and the ion exchange system comprises a second heat pipe.

8. The ion exchange system of claim 7 wherein the second heat pipe includes a first portion inside of the housing and a second portion extending outside the housing and through the radiation shielding to dissipate heat to the ambient environment.

9. The ion exchange system of claim 1 wherein the ion exchange media is fully loaded with the one or more radionuclides.

10. The ion exchange system of claim 9 wherein the one or more radionuclides includes Cs-137.

11. An ion exchange system comprising:
radiation shielding;
an ion exchange column including a housing surrounded by the radiation shielding, the housing having an inlet for receiving liquid waste comprising one or more radionuclides, and an outlet for discharging treated liquid after the treated liquid has passed over ion exchange media positioned inside the housing, the radiation shielding defining a gap between the radiation shielding and the ion exchange column, wherein the gap is a closed volume between the radiation shielding and housing for insulating the ion exchange column; and
a passive cooling system including a working fluid used to transfer heat away from the ion exchange column, the passive cooling system including an elongate heat pipe, the elongate heat pipe being a closed system defined by first and second closed ends of the elongate heat pipe, wherein the working fluid is within the elongate heat pipe and the elongate heat pipe:
  extends along a surface of the housing of the ion exchange column and through the radiation shielding to dissipate heat from the ion exchange column to an ambient environment;
  has a first portion extending to the first closed end, the first closed end extending into the gap and out of contact with the housing to form a reservoir for the working fluid; and
  has a second portion extending to the second closed end in the ambient environment;
wherein the passive cooling system is a closed system; and
wherein, in a first mode of operation, when the ion exchange column is in-service and at least partially loaded with the one or more radionuclides, liquid waste flows through the ion exchange column transferring heat out of the ion exchange column, and, in a second mode of operation, when flow through the inlet and outlet are stopped and the ion exchange column is out-of-service, drained, and at least partially loaded with the one or more radionuclides, the working fluid transfers heat from inside the housing to outside the radiation shielding.

12. The ion exchange system of claim 11 wherein the passive cooling system includes a natural convection radiator that enhances heat transfer away from the working fluid.

13. The ion exchange system of claim 11 wherein the elongate heat pipe is a thermosiphon.

14. The ion exchange system of claim 11 wherein the passive cooling system includes a dual phase working fluid.

15. The ion exchange system of claim 11 wherein the passive cooling system includes a single phase working fluid.

16. The ion exchange system of claim 11 wherein the elongate heat pipe is oriented at least approximately vertically.

17. The ion exchange system of claim 11 wherein the elongate heat pipe includes the first portion positioned to abut the housing of the ion exchange column and the second portion positioned to extend away from the housing and through the radiation shielding.

18. The ion exchange system of claim 11 wherein the elongate heat pipe is a first heat pipe and the ion exchange system comprises a second heat pipe, and wherein the second heat pipe includes a first portion inside of the housing and a second portion extending outside the housing and through the radiation shielding to dissipate heat to the ambient environment.

19. The ion exchange system of claim 11 wherein the ion exchange media is fully loaded with the one or more radionuclides.

20. The ion exchange system of claim 19 wherein the one or more radionuclides includes Cs-137.

21. A method comprising:
flowing a liquid waste stream comprising radionuclides through an ion exchange column comprising a housing;
transferring heat out of the ion exchange column as the liquid waste stream flows through the ion exchange column;
separating radionuclides from the liquid waste stream with the ion exchange column;
removing the ion exchange column from service when it is at least partially loaded with the radionuclides; and
passively cooling the ion exchange column with a working fluid in a closed system comprising an elongate heat pipe dissipating heat from the ion exchange column to an ambient environment wherein:
  the elongate heat pipe is a closed system defined by first and second closed ends of the elongate heat pipe;
  the working fluid is within the elongate heat pipe;
  the elongate heat pipe extends along and abuts a surface of the ion exchange column and through the housing and radiation shielding that defines a gap between the radiation shielding and the housing, wherein the gap is a closed volume between the radiation shielding and housing for insulating the ion exchange column; and
  a first portion of the elongate heat pipe extends to the first closed end, the first closed end extending into the gap and out of contact with the housing to form a reservoir for the working fluid; and
  heat is dissipated from the ion exchange column to the ambient environment at the second closed end of the elongate heat pipe.

* * * * *